United States Patent
Wendt et al.

(10) Patent No.: US 9,912,487 B2
(45) Date of Patent: Mar. 6, 2018

(54) DC POWER DISTRUBUTION SYSTEM

(71) Applicant: PHILIPS LIGHTING HOLDING B.V., Eindhoven (NL)

(72) Inventors: Matthias Wendt, Wüselen (DE); Bozena Erdmann, Aachen (DE); Manuel Eduardo Alarcon-Rivero, Delft (NL); Maurice Herman Johan Draaijer, Ittervoort (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 172 days.

(21) Appl. No.: 14/781,057

(22) PCT Filed: Mar. 29, 2014

(86) PCT No.: PCT/IB2014/060294
§ 371 (c)(1),
(2) Date: Sep. 29, 2015

(87) PCT Pub. No.: WO2014/155366
PCT Pub. Date: Oct. 2, 2014

(65) Prior Publication Data
US 2016/0043873 A1    Feb. 11, 2016

Related U.S. Application Data

(60) Provisional application No. 61/806,440, filed on Mar. 29, 2013.

(51) Int. Cl.
*H04L 12/10* (2006.01)
*H04B 3/54* (2006.01)
*H02J 1/00* (2006.01)

(52) U.S. Cl.
CPC ............... *H04L 12/10* (2013.01); *H02J 1/00* (2013.01); *H04B 3/548* (2013.01); *H04B 2203/547* (2013.01)

(58) Field of Classification Search
CPC ....................................................... H04B 3/548
See application file for complete search history.

(56) References Cited

U.S. PATENT DOCUMENTS

| 2010/0237695 A1 | 9/2010 | Covaro et al. |
| 2012/0044691 A1 | 2/2012 | Covaro |

(Continued)

FOREIGN PATENT DOCUMENTS

WO    2012028981 A1    3/2012

*Primary Examiner* — Jeffrey Zweizig
(74) *Attorney, Agent, or Firm* — Meenakshy Chakravorty

(57) ABSTRACT

The invention relates to a DC power distribution system, especially an EMerge DC power distribution system (1). The system is adapted such that power conductors (3, 4) electrically connected to different groups (5, 6) of ports (14) belong to separate power line communication (PLC) channels, wherein several electrical loads (7 . . . 10; 11 . . . 13) are in power line communication with a group of ports of a same PLC channel. The separation of the different PLC channels allows for a relatively simple determination to which group of ports which electrical loads are electrically connected. This information can be used by, for instance, a user to commission the electrical loads. For example, if the locations of the power conductors, which are electrically connected to certain groups of ports, are known, the information about which electrical loads are connected to which groups of ports can be used for determining the location of the respective electrical load.

13 Claims, 11 Drawing Sheets

(56) References Cited

U.S. PATENT DOCUMENTS

2012/0181865 A1 7/2012 Muthu
2012/0303173 A1 11/2012 Covaro et al.
2014/0361620 A1* 12/2014 Van Hartskamp ....... G05B 9/02
                                                                               307/31

\* cited by examiner

DC POWER DISTRUBUTION SYSTEM

CROSS-REFERENCE TO PRIOR APPLICATIONS

This application is the U.S. National Phase application under 35 U.S.C. § 371 of International Application No. PCT/IB2014/060294, filed on Mar. 29, 2014, which claims the benefit of U.S. Provisional Patent Application No. 61/806,440, filed on Mar. 29, 2013. These applications are hereby incorporated by reference herein.

FIELD OF THE INVENTION

The invention relates to a direct current (DC) power distribution system for distributing DC power from a power supply module to electrical loads.

BACKGROUND OF THE INVENTION

Version 1.1 of the EMerge Occupied Space standard defines a DC power distribution system having a power supply module, several bus bars electrically connected to the power supply module and several electrical loads electrically connected to the bus bars, in order to receive DC power from the power supply module via the bus bars. The DC power distribution system may be installed at a ceiling of a room, where a large amount of different electrical loads like several light devices, sensors or other electrical consumers may be electrically connected to the bus bars. Commissioning the large amount of electrical loads is a tedious task. For instance, a user like an installer may need to check for each electrical load where it is located.

SUMMARY OF THE INVENTION

It is an object of the present invention to provide a DC power distribution system having a power supply module, several power conductors electrically connected to the power supply module and several electrical loads electrically connected to the power conductors, which allows for an easier commissioning of the electrical loads.

In a first aspect of the present invention a DC power distribution system is presented, wherein the system comprises:
  a power supply module having several groups of ports for providing DC power,
  several power conductors electrically connected to the several ports for distributing the DC power and for transmitting power line communication signals, and
  several electrical loads electrically connected to the power conductors, wherein the electrical loads are adapted to send power line communication identification signals over the power conductors, wherein a power line communication identification signal is indicative of the respective electrical load,
wherein the power supply module and the power conductors are adapted such that power conductors electrically connected to different groups of ports belong to separate power line communication channels and wherein several electrical loads are in power line communication with a group of ports of a same power line communication channel.

Different groups of ports correspond therefore to different power line communication universes, i.e. power line communication signals can be separately addressed to the different groups of ports. Electrical loads electrically connected to power conductors, which are electrically connected to different groups of ports of the power supply module, are therefore, regarding the power line communication, separated from each other. This allows determining to which group of ports which electrical loads are electrically connected depending on power line communication identification signals received via the respective power line communication channel. This information can be used by, for instance, a user to commission the electrical loads. For example, if the locations of the power conductors, which are electrically connected to certain groups of ports, are known, the information to which group of ports a respective electrical load is electrically connected can be used for determining the location of the respective electrical load. In particular, if it is known that power conductors connected to a certain group of ports are located within a certain room, it can be determined which electrical loads are located in this room based on the information provided by the electrical loads determination unit. Moreover, at least regarding one power line communication channel several electrical loads are in power line communication with a group of ports of a same power line communication channel such that these electrical loads can be regarded as forming a group of electrical loads. Since the power line communication channels are separated, it can easily be detected which electrical loads belong to this group.

The system preferentially further comprises a power line communicator for receiving the power line communication identification signals from the electrical loads via the power conductors and an electrical loads determination unit for determining information being indicative of which electrical loads are electrically connected to which group of ports depending on the received power line communication identification signals, wherein also the power line communicator is adapted such that power conductors electrically connected to different groups of ports belong to separate power line communication channels. The entire process of receiving power line communication identification signals being indicative of the respective electrical loads and determining which electrical loads are electrically connected to which group of ports depending on the received power line communication signals, wherein this determined information can later be used for determining the locations of the different electrical loads, can be regarded as being a discovery procedure, which can be performed by the DC power distribution system.

The power supply module, the power conductors and optionally also the power line communicator can be adapted such that power conductors electrically connected to different groups of ports permanently or temporally belong to separate power line communication channels. For instance, the DC power distribution system may be switchable between a discovery mode, in which the power line communication channels are separated for performing the discovery procedure, and a normal mode, in which the power line communication channels are not separated.

The electrical loads are, for example, lighting devices, sensing devices, air conditioning devices, et cetera. The power supply module preferentially comprises a converter for converting AC power, which may be received from an AC mains supply, to the DC power to be distributed via the power conductors. The power conductors are preferentially bus bar, which may also be regarded as being bus bar components, particularly in accordance with version 1.1 of the EMerge Occupied Space standard.

The power line communicator can be regarded as being a power line communication modem, which is adapted to receive power line communication identification signals and preferentially also other power line communication signals and which is preferentially also adapted to send power line communication signals via the power conductors.

A group of ports may comprise a single port or several ports. In particular, ports, to which power conductors located within a certain part of a building like a certain floor or a certain room are electrically connected, can form a group of ports.

The system may be adapted such that the determined information is stored in one component of the system or distributed over several components of the system. If the determined information is distributed over several components of the system, in each electrical load it may be stored only, to which group of ports the respective electrical load is electrically connected and optionally also which other electrical loads are electrically connected to this group. If the system comprises several power line communicators, it may also be stored in the respective electrical load which power line communicator addresses the respective group of ports.

The electrical loads determination unit may be adapted to detect, when an electrical load is attached to a power conductor and to automatically determine the information being indicative of which electrical loads are electrically connected to which groups of port, when it has been detected that an electrical load has been electrically connected to a power conductor. For instance, the electrical loads can be adapted to automatically send a signal to the power line communicator electrically connected to the power conductor, to which the electrical load is attached, wherein then the power line communicator can forward this signal to the electrical loads determination unit, which may be adapted to detect that an electrical load has been attached to a power conductor based on this signal. This signal can trigger a discovery process, or this signal can already be a power line communicator identification signal, which can directly be used for determining to which group of ports the respective electrical load has been electrically connected.

The power line communicator may be connected to the ports via a switching unit, wherein the switching unit is adapted such that the power line communicator is switchable between the several groups of ports. That means the switching unit is adapted such that at a time only one group of ports is connected to the power line communicator and that it is modifiable to which group of ports the power line communicator is connected. The switching unit can comprises several switching elements, i.e. for each group of ports a single switching element, wherein the switching elements are controlled such that at a time only one switching element is open, i.e. conducting regarding the power line communication signals, and the other switching elements are closed, i.e. not conducting regarding the power line communication signals, such that at a time only one group of ports is connected to the power line communicator.

In another embodiment the system may comprise several power line communicators connected to the groups of ports such that to each group of ports a separate power line communicator is connected. In this case it is not necessary to provide a switch between a power line communicator and several groups of ports.

Preferentially, the power line communicator is integrated with the power supply module. It may therefore not be necessary to install an additional power line communicator, which can simplify the installation of the DC power distribution system. However, the power line communicator may also be a separate device, wherein the power supply module and the power line communicator may be adapted such that the power line communicator is internally or externally addable to the power supply module. The power line communicator can also be a separate device directly electrically connectable to a power conductor, in order to receive power line communication identification signals from the power conductor. In particular, the system can comprise several power line communicators, i.e. for each group of ports a power line communicator, wherein each power line communicator is electrically connected to a power conductor, which is electrically connected to the respective group of ports, in order to receive the power line communication identification signals from the electrical loads electrically connected—via one or several power conductors—to the respective group of ports.

In a further embodiment the power line communicator is a separate device electrically connected to several power conductors, which are connected to different groups of ports, wherein the system comprises a switching unit for switching via which power conductor power line communication signals are to be sent and/or received by the power line communicator. The power line communicator may be connected to the several power conductors via electrical connectors, wherein the electrical connectors may comprise switching elements forming the switching unit. The switching elements are preferentially addressable such that the respective power conductor and, thus, the respective power line communication channel can be connected or disconnected. The switching elements can comprise wireless sending and receiving elements for being wirelessly addressable. However, they can also be switchable in another way. For instance, they can comprise a hardware switch to be actuated by an operator. The switching elements can also be controllable by the power line communicator, for instance, via the power line communication. In a further embodiment the switching unit can be integrated in the power line communicator and be adapted to physically disable the sending and/or receiving of power line communication signals from a respective power conductor and/or to filter out power line communication signals from a respective power conductor.

In a further embodiment the power line communicator is integrated in an electrical connector to be connected to a power conductor. The electrical connector may just be an electrical connector of an electrical load or of another device to be connected to a power conductor such that it may not be necessary to additionally add power line communicators to the power conductors, which may simplify the installation of the DC power distribution system. The electrical connector may also be an electrical connector with the integrated power line communicator, without connecting a further device to the power conductor.

In a further embodiment the power supply module is adapted such that power line communication signals propagate between the different groups of ports, wherein the power line communicator comprises a filter for filtering a power line communication signal received via the groups of ports, wherein the filter is adapted such that, if power line communication identification signals have been requested via a certain group of ports, the received power line communication identification signals are filtered in a way that the filtered signals are power line communication identification signals only from the electrical loads electrically connected to the one or several power conductors, which are electrically connected to the certain group of ports. The filter is preferentially a switchable filter, i.e. a filter that is switchable between the different groups of ports, wherein the filter may be adapted to cut off or short circuit the power line communication for all other groups of ports.

In a preferred embodiment the system comprises at least two power line communicators connected to at least two different groups of ports, wherein the at least two power line communicators are adapted to concurrently receive power line communication identification signals. In particular, to each group of ports a power line communicator may be assigned such that for all groups of ports power line communication identification signals can be received in parallel. This increases the speed of the discovery procedure.

The power line communicator may comprise a user switch for allowing a user to define which electrical load belongs to which power line communication channel. For instance, if the system comprises several power conductors, wherein to each power conductor electrical loads are attached and wherein to each power conductor a respective power line communicator is in power line communication, the power line communicators may be connected to each other and each power line communicator may comprise a user switch allowing the user to define to which power line communication channel the respective power conductor and correspondingly the electrical loads attached to the respective power conductor should belong. For instance, the user switch may be adapted to allow a user to choose between power line communication channels A, B, C, D, wherein for each power conductor the user can define to which of these power line communication channels A, B, C, D the respective power conductor and the attached electrical loads should belong. This allows the user to merge two or more power conductors to a single power line communication channel, if these power conductors have been selected by the user as belonging to the same power communication channel. The user switches can therefore be adapted to allow a user like an installer to separate and merge power line communication channels as desired during or after installation.

In a further aspect of the present invention a diagnostic unit for a DC power distribution system as defined in claim 1 is presented, wherein the diagnostic unit is adapted to initiate sending power line communication signals via a first power line communication channel and receiving power line communication signals via a separate, second power line communication channel, wherein the diagnostic unit is further adapted to diagnose a disturbance of one power line communication channel by another separate power line communication channel, when a power line communication signal is received via the separate, second power line communication channel, which is influenced by a power line communication signal sent via the first power line communication channel. Thus, the diagnostic unit can determine, for instance, cross-talk and/or leaks between the power line communication channels.

In a further aspect of the present invention an electrical loads determination system for being used with the DC power distribution system as defined in claim 1 is presented, wherein the electrical loads determination system comprises:
  a power line communicator for receiving the power line communication identification signals from the electrical loads via the power conductors, wherein also the power line communicator is adapted such that power conductors electrically connected to different groups of ports belong to separate power line communication channels, and
  an electrical loads determination unit for determining information being indicative of which electrical loads are electrically connected to which group of ports depending on the received power line communication identification signals.

In a further aspect of the present invention an electrical loads determination method for being used with the DC power distribution system as defined in claim 1 is presented, wherein the method comprises:
  sending power line communication identification signals over the power conductors by the electrical loads electrically connected to the power conductors, wherein the power conductors are electrically connected to several groups of ports of the power supply module and wherein a power line communication identification signal is indicative of the respective electrical loads,
  receiving the power line communication identification signals from the electrical loads via the power conductor components by the power line communicator, wherein the power supply module, the power line communicator and the several power conductors are adapted such that power conductors electrically connected to different groups of ports belong to separate power line communication channels, and
  determining information being indicative of which electrical loads are electrically connected to which group of ports depending on the received power line communication signals by the electrical loads determination unit.

In a further aspect of the present invention an electrical loads determination computer program for being used with the DC power distribution system as defined in claim 2 is presented.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
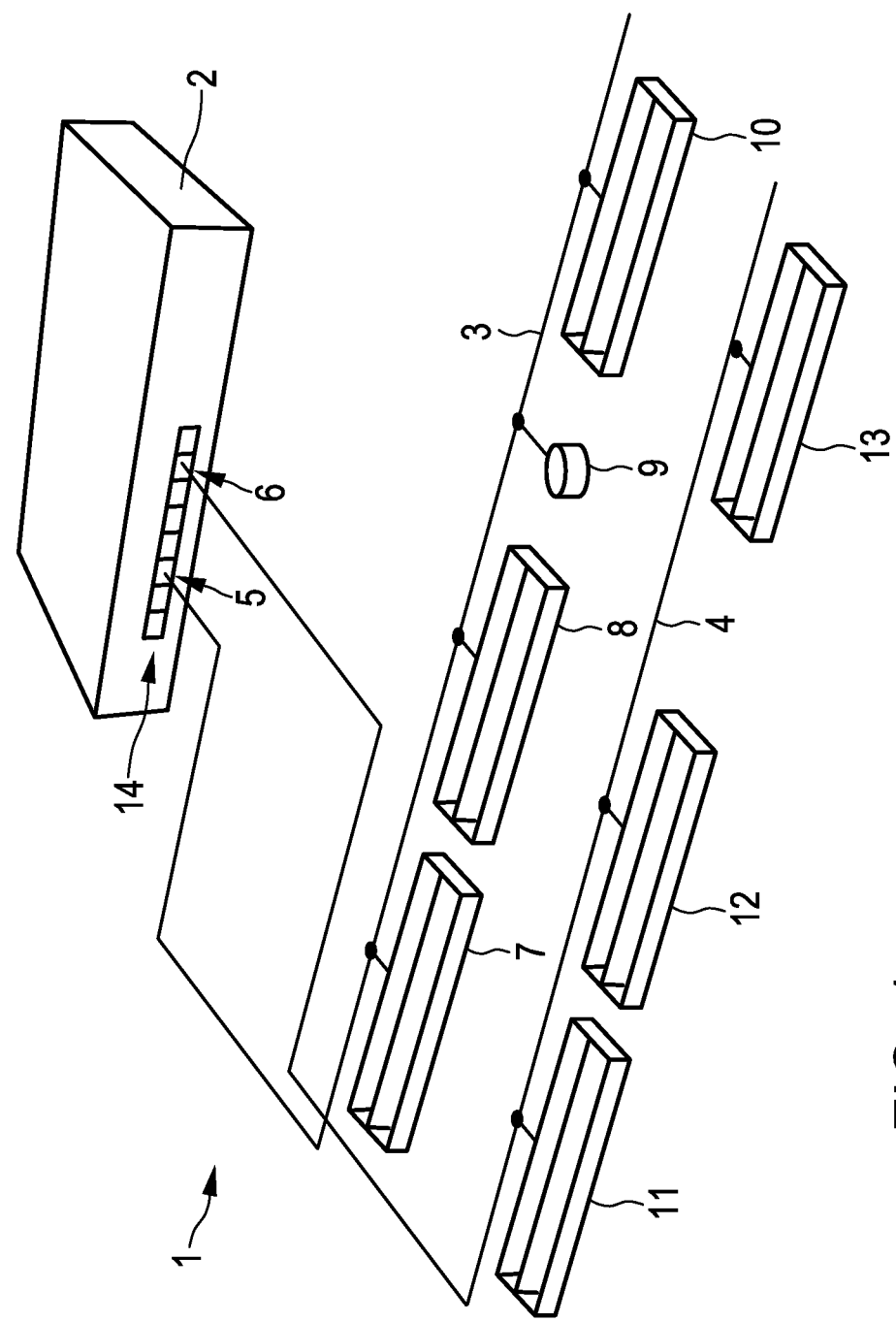
FIG. 1 shows schematically and exemplarily an embodiment of a DC power distribution system.

FIG. 1 shows schematically and exemplarily an embodiment of a DC power distribution system. The DC power distribution system 1 comprises a power supply module 2 having several groups of ports 14 for providing DC power, wherein in this embodiment each group comprises a single port only. The DC power distribution system 1 further comprises several bus bars 3, 4 electrically connected to the several groups of ports for distributing the DC power. In this embodiment a bus bar 4 is electrically connected to the port 6 and another bus bar 3 is electrically connected to the port 5. Several electrical loads 7 . . . 13 are electrically connected to the bus bars 3, 4, wherein the electrical loads 7 . . . 13 are adapted to send power line communication identification signals, which are indicative of the respective electrical load 7 . . . 13, over the bus bars 3, 4. In this embodiment two kinds of electrical loads are electrically connected to the bus bars 3, 4, lighting devices 7, 8, 10 . . . 13 and a sensing device 9. The sensing device 9 is adapted to, for instance, detect the presence of a person, wherein if the presence of a person has been detected, a corresponding presence signal can be transmitted via the bus bar 3 to the power supply module 2, which can be adapted to generate a switching signal to be transmitted to the lighting devices 7, 8, 10 . . . 13, in response to the received presence signal, wherein the lighting devices 7, 8, 10 . . . 13 can be adapted to be switched on, when they receive the switching signal.

Figure 2:
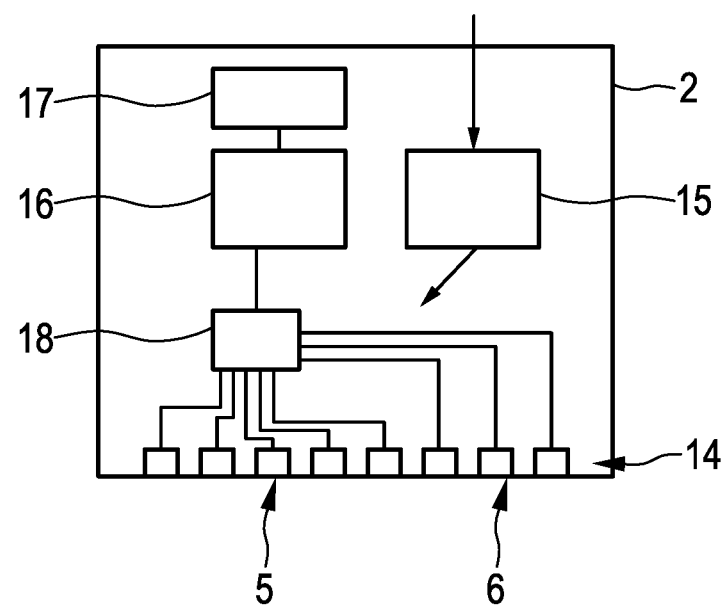
FIG. 2 shows schematically and exemplarily an embodiment of a power supply module of the DC power distribution system.

FIG. 2 shows schematically and exemplarily the power supply module 2 in more detail. As can be seen in FIG. 2, the power supply module 2 comprises a power line communicator 16 for receiving the power line communication identification signals from the electrical loads 7 . . . 13 via the bus bars 3, 4 electrically connected to the ports 5, 6. The power line connector 16 is connected to the ports 14 via a switching unit 18, wherein the switching unit 18 is adapted such that the power line communicator 16 is switchable between the several ports 14. That means that the switching unit 18 is adapted such that at a time only one port is connected to the power line communicator 16 and that it is modifiable to which port the power line communicator is connected. The switching unit 18 can be configured in different ways, in order to provide the switching functionality. For instance, the switching unit 18 can comprise several switching elements, i.e. for each port a single switching element, wherein the switching elements are controlled such that at a time only one switching element is conducting regarding power line communication signals and the other switching elements are not conducting regarding the power line communication signals, in order to connect only a single port to the power line communicator 16 at a time. The switching elements can be relays or semiconductor switches. The switching unit 18 can be adapted to be operated in two different modes, i.e. a discovery mode and a normal mode. In the discovery mode the switching unit 18 may connect the power line communicator 16 to a single port only at a time, whereas in the normal mode the switching unit 18 may connect the power line communicator 16 to all ports 14.

The power supply module 2 further comprises a power converter 15 for converting AC power received from a mains supply to the DC power to be distributed via the ports 5, 6 and the bus bars 3, 4. The power converter 15 is of course also electrically connected to the ports 14. This is indicated in FIG. 2 by an arrow only for clarity reasons. The propagation of the power supplied by the power converter 15 to the ports 14 is independent of the propagation of the high-frequency modulated power line communication signals.

Figure 3:
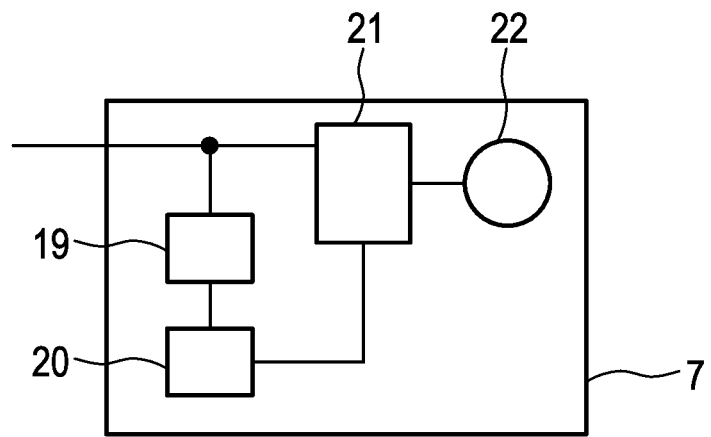
FIGS. 3 and 4 show schematically and exemplarily embodiments of electrical loads of the DC power distribution system.

FIG. 3 shows schematically and exemplarily an embodiment of a lighting device 7. The lighting devices 8, 10 . . . 13 are similar to the lighting device 7 shown in FIG. 3. The lighting device 7 comprises a power line communicator 19 for sending and receiving power line communication signals via the bus bar 3. In particular, the power line communicator 19 is adapted to send power line communication identification signals via the bus bar 3 to the power supply module 2. Moreover, the power line communicator 19 is adapted to receive power line communication control signals from the power supply module 2 and to forward the received power line communication control signals to a lamp control unit 20. The lamp control unit 20 is adapted to control a lamp power converter 21 in accordance with the control signal received from the power line communicator 19. The lamp power converter 21 is adapted to power a lamp 22 in accordance with the control performed by the lamp control unit 20. Furthermore, the lamp power converter 21 receives the DC power from the bus bar 3 and converts the received power to a power suitable for the lamp 22.

Figure 4:
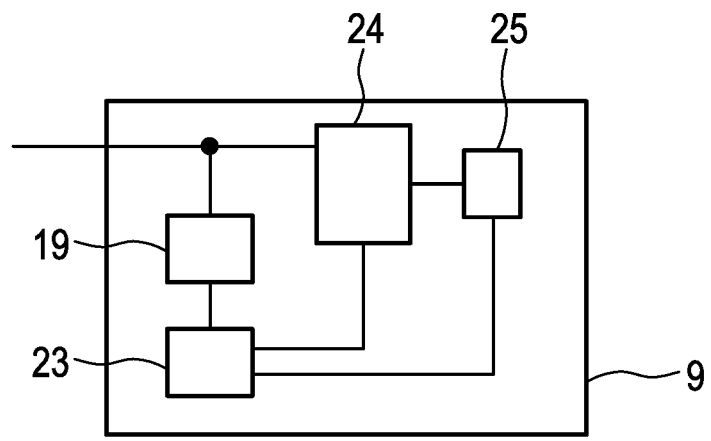

FIG. 4 shows schematically and exemplarily the sensing unit 9 in more detail. As can be seen in FIG. 4, the sensing unit 9 also comprises a power line communicator 19 for sending power line communication identification signals to the power supply module 2 via the bus bar 3. In this embodiment the power line communicator 19 is further adapted to receive power line communication control signals from the power supply module 2 and to forward the control signals to a sensor control unit 23, which is adapted to control a sensor power converter 24 in accordance with the received control signals. The sensor power converter 24 is adapted to convert the DC power received from the bus bar 3 to a DC power suitable for a sensor 25. The sensor 25 is for example a presence sensor for detecting a presence of a person. If a presence of a person has been detected, the sensor control unit 23 can generate a corresponding presence signal, which can be sent to the power supply module 2 via the power line communicator 19.

In another embodiment the sensing unit may not be adapted to receive power line communication control signals. Moreover, the sensing unit may be adapted to receive control commands via another data connection, for instance, via a wireless data connection, in order to remotely activate or deactivate the sensing unit or in order to set a desired sensitivity level. Moreover, instead of a presence sensor the sensing unit can also comprise another kind of sensor like a movement sensor, a light flux sensor, a daylight sensor, a safety camera, a carbon-dioxide sensor, a sensor for detecting the positions of blinds of windows, et cetera.

Referring again to FIG. 2, the power supply module 2 comprises an electrical loads determination unit 17 for determining information being indicative of which electrical loads are electrically connected to which ports depending on the received power line communication identification signals, wherein the power supply module 2, the power line communicator 16 and the several bus bars 3, 4 are adapted such that bus bars electrically connected to different ports belong to separate power line communication channels, at least in the discovery mode, if the switching unit 18 is operable in a discovery mode and a normal mode. Thus, power line communication signals can be separately addressed to the different ports, i.e. each port and the electrical loads electrically connected to the respective port via the respective bus bar form a separate communication universe such that, regarding the power line communication, electrical loads electrically connected to bus bars, which are electrically connected to different ports of the power supply module, are separated from each other.

The information being indicative of which electrical loads are electrically connected to which groups of ports, which has been determined by the electrical loads determination unit, can be stored in the power supply module 2, for instance, in the electrical loads determination unit 17, or in other components of the DC power distribution system 1, for instance, in one or several of the electrical loads 7 ... 13. In the latter case the determined information or at least a part of the determined information is transmitted to the respective electrical loads via the respective power line communication channel. If the determined information is distributed over several devices of the DC power distribution system 1, in each electrical load 7 ... 13 it may be stored only, to which group of ports, i.e. in this embodiment to which port, the respective electrical load is electrically connected. Optionally, it may also be stored in the respective electrical load which other electrical loads are electrically connected to the same port. The information which electrical load is electrically connected to which port can be stored in a table, wherein the table may also comprise further information like capabilities and characteristics of the respective electrical load, for instance, the type or model of the respective electrical load, the vendor, the actual or maximum power requirements, the current status of the load, for example, whether a lighting device is on, off or dimmed, et cetera. These additional capabilities and characteristics can be communicated via the respective power line communication channel from the respective electrical load to, for instance, the power supply module 2, in order to allow the power supply module 2 to add these additional capabilities and characteristics to the stored table. It can also be stored in the table, which power line communicator communicates via which port. In particular, if the table is stored in a distributed way, wherein in each electrical load at least the port is stored, to which the respective electrical load is electrically connected, at this respective electrical load it can also be stored which power line communicator addresses the port, to which the respective electrical load is electrically connected.

The electrical loads determination unit 17 is preferentially adapted to detect, when an electrical load is attached to a bus bar and to automatically determine the information being indicative of which electrical loads are electrically connected to which ports, when it has been detected that an electrical load has been electrically connected to a bus bar. The discovery procedure may therefore be performed at a time a new device, i.e. a new electrical load, joins the system. Alternatively or in addition, the electrical loads determination unit 17 may be adapted to ask the electrical loads to send their power line communication identification signals over the power conductors, in order to allow the electrical loads determination unit 17 to determine the information being indicative of which electrical loads are electrically connected to which ports. The electrical loads determination unit 17 can be adapted to send corresponding discovery requests to the electrical loads at the beginning of a discovery procedure, which may be initiated in regular time intervals or by a trigger event. The trigger event may be, for instance, a detection of a jump in power consumption detected by the power supply module 2, which can be due to an insertion of an additional electrical load. This allows for an autodiscovery without any installer action. However, the system can also be adapted to allow a user like an installer to initiate the discovery procedure via, for instance, a switching element to be activated by the user.

The system may be operable in a discovery mode, in which the power line communication channels are separated from each other, and a normal mode, in which the power line communication channels are connected. Each time a discovery procedure should start, the system may change to the discovery mode, whereas, after the discovery procedure has been completed, it may change back to the normal mode.

Figure 5:
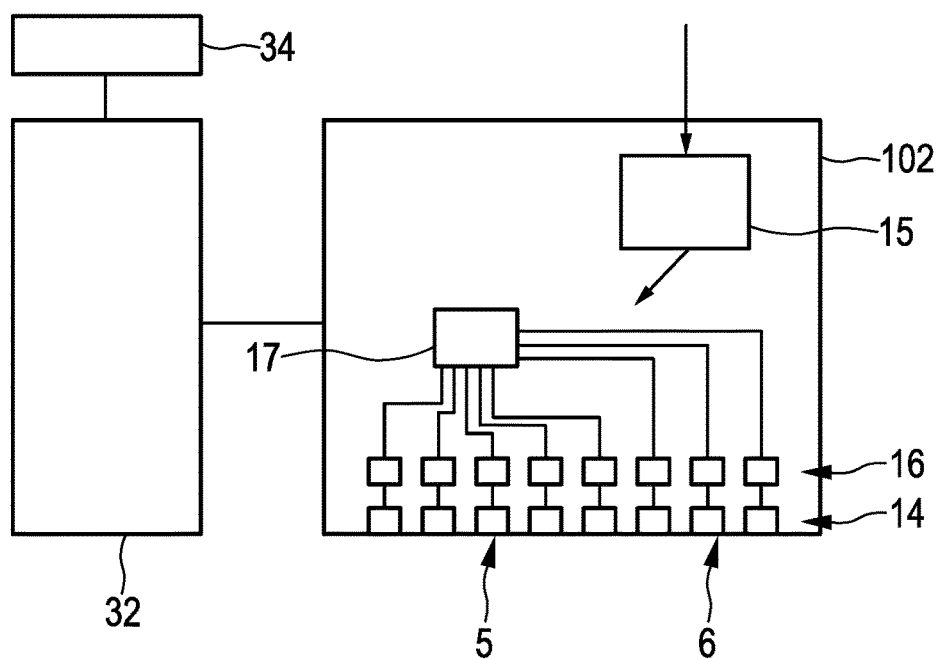
FIG. 5 shows schematically and exemplarily another embodiment of the power supply module.

FIG. 5 shows schematically and exemplarily a further embodiment of the power supply module. The embodiment of the power supply module 102 shown in FIG. 5 comprises several power line communicators 16 connected to the ports 14 such that to each port 14 a separate power line communicator 16 is connected. The electrical loads determination unit 17 is connected to each of these power line communicators 16, in order to receive from the power line communicators 16 power line communication identification signals, which allows the electrical loads determination unit 17 to determine the information being indicative of which electrical loads are electrically connected to which ports. Also the power supply module 102 comprises a power converter 15 for converting AC mains power received from a mains supply to DC power. The power converter 15 is electrically connected to the ports 14, in order to allow the power supply module 102 to distribute the DC power via the ports 14 and the bus bars 3, 4 to the electrical loads 7 ... 13. Also in this embodiment the power line communicators 16 are electrically connected and adapted such that each port 14 and a bus bar 3, 4 connected to a respective port 14 belongs to a separate power line communication channel. Thus, also in this embodiment different ports correspond to different power line communication universes, i.e. power line communication signals can be separately addressed to the different ports.

A diagnostic unit 32 can be electrically connected to the power supply module as schematically and exemplarily shown in FIG. 5. The diagnostic unit 32 is adapted to diagnose a disturbance of one power line communication channel by another separate power line communication channel. Preferentially, the diagnostic unit 32 is adapted to detect such a disturbance, if a power line communicator receives a power line communication signal via its separate power line communication channel, which is influenced by a power line communication signal sent by another power line communicator via another separate power line communication channel. For instance, one of the separate communication universes can be selected for performing a power line communication and a power line communication signal or noise level can be measured on one or several other power line communication universes. In this way the power line communication can be used for diagnostic purposes for the DC power distribution system, in order to determine undesired cross-talks or leaks between the power line communication channels. The result of the diagnosis can be shown on a display 34.

If the DC power distribution system comprises the power supply module 102 shown in FIG. 5, i.e. if several power line communicators 16 are connected to several ports 14, the power line communicators 16 are preferentially adapted to concurrently receive power line communication identification signals. In particular, for all ports 14 power line communication identification signals may be received in parallel. This leads to a very fast discovery procedure. The several power line communicators 16, which may also be regarded as being power line modems, may be activatable and deactivatable. For instance, each power line communicator 16 may comprise an enable pin, wherein the respective power line communicator is activated, if a logical true signal is applied to the enable pin, and wherein the respective power line communicator is deactivated, if a logical false signal is applied to the enable pin. Activating some of the power line communicators 16 can allow the electrical loads determination unit 17 to address only a certain part of the installation in a technically relatively simple way, if desired.

Figure 6:
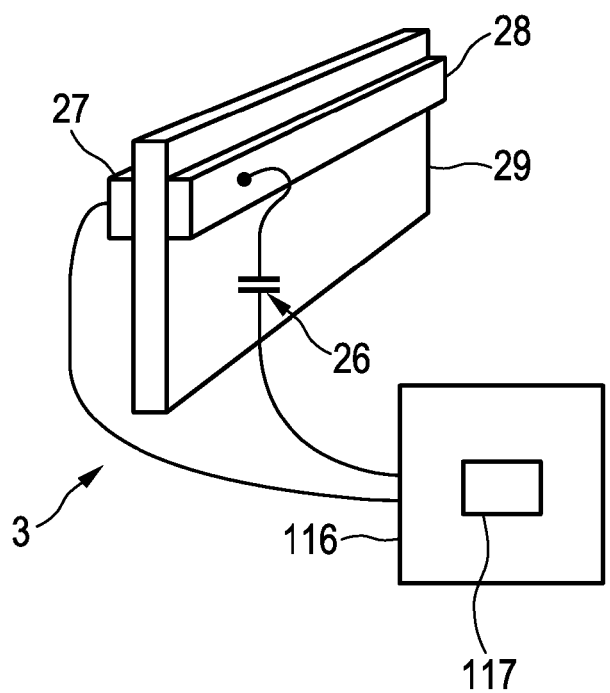
FIG. 6 shows schematically and exemplarily a power line communicator electrically connected to a bus bar.

Although in the embodiments described above with reference to FIGS. 1 to 5 the power line communicators are integrated in power supply modules and electrical loads, the DC power distribution system can also comprise a separate power line communicator as schematically and exemplarily illustrated in FIG. 6. In FIG. 6 a power line communicator 116 is electrically connected to a minus conductor 27 and a plus conductor 28 attached to a carrying element 29 of the bus bar 3. The power line communicator 116 is electrically connected to the plus conductor 28 via a coupling capacitor 26. In particular, the DC power distribution system can comprise several power line communicators 116, i.e. for each port a single power line communicator 116, wherein each power line communicator 116 is electrically connected to a bus bar, which is electrically connected to the respective port, in order to receive the power line communication identification signals from the electrical loads electrically connected—via one or several bus bars—to the respective port. In this embodiment the power line communicator 116 comprises an electrical loads determination unit 117 for determining information being indicative of which electrical loads are electrically connected to the port of the respective power line communication channel, wherein the ports of the power supply module are separated from each other regarding the power line communication. Thus, different ports correspond to different power line communication universes, i.e. power line communication signals can be separately addressed to the different ports. If the separate power line communicator 116 schematically and exemplarily shown in FIG. 6 is used, the power supply module can be a power supply module without any power line communicator integrated. Each power line communicator 116 may be activated separately to scan the bus bars for the electrical loads. They may be activated by using hardware switches or in another way. For instance, they can be activated by receiving an activation signal from a control unit via the power line communication channel or via another communication channel like a wireless communication channel. The information determined by the electrical loads determination units 117 of the power line communicators 116 can be send to a device of the system like an electrical load and/or the power supply module, or to a further device like an external control unit for collecting the information and for providing a table defining which electrical loads are electrically connected to which ports. This collection of the information can be performed via the power line communication in a normal mode, in which the power line communication channels are not separated, or by using another data connection, which may be wireless.

Figure 7:
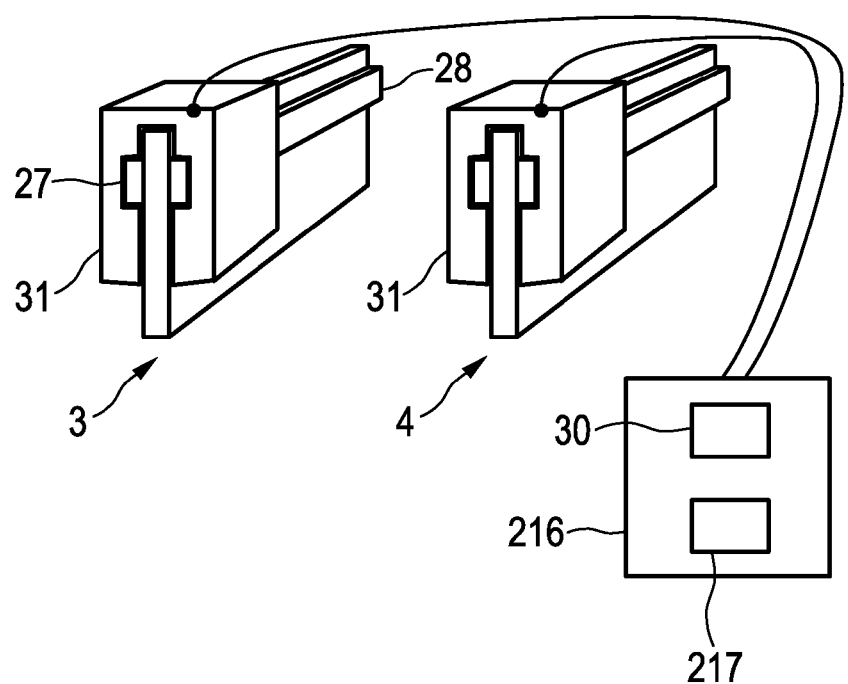
FIG. 7 shows schematically and exemplarily a power line communicator with a switching unit attached to two bus bars.

As schematically and exemplarily shown in FIG. 7, a single power line communicator 216 can also be electrically connected to several bus bars 3, 4 via connectors 31. In this case the power line communicator 216 comprises a switching unit 30 for switching via which bus bars power line communication signals are to be sent and/or received. Also in this embodiment the power line communicator 216 is connected with the conductors 28, 27 of the respective bus bar via a coupling capacitor, which may be integrated in the connectors 31. The power line communicator 216 comprises an electrical loads determination unit 217 for determining the information being indicative of which electrical loads are electrically connected to which port depending on power line communication identification signals received via the connectors 31. The switching unit 30 is adapted to physically disable the sending and/or receiving of power line communication signals from a respective bus bar 3, 4 and/or to filter out power line communication signals from a respective bus bar 3, 4.

Figure 8:
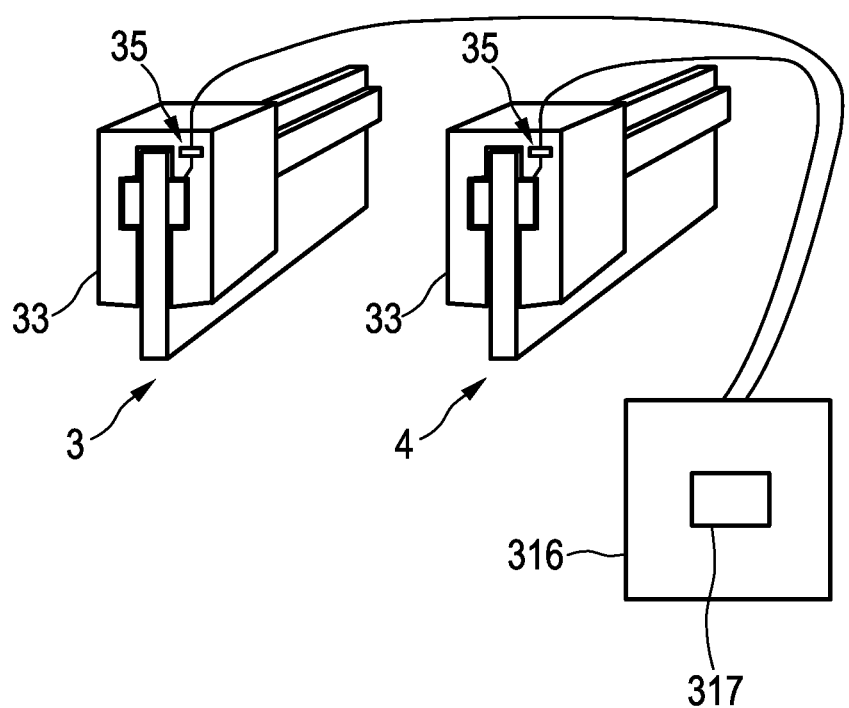
FIG. 8 shows schematically and exemplarily a power line communicator without a switching unit electrically connected to two bus bars.

As schematically and exemplarily shown in FIG. 8, a switching unit may not be integrated into a power line communicator 316, but switching elements 35 may be integrated in connectors 33. The switching elements 35 are addressable such that the respective bus bar and, thus, the respective power line communication channel can be connected or disconnected from the power line communicator 316. The switching elements 35 can comprise wireless sending and receiving elements for being wirelessly addressable. However, they can also be switchable in another way. For instance, the switching elements 35 can comprise a hardware switch to be actuated by an operator. The switching elements 35 can also be controllable by the power line communicator 316, for instance, via the power line communication or via another data connection. The switching elements 35 are switched such that, at least in a discovery mode, a time only one of the bus bars 3, 4 is in power line communication with the power line communicator 316, in order to provide separate power line communication channels. The power line communicator 316 comprises an electrical loads determination unit 317 for determining the information being indicative of which electrical loads are electrically connected to which ports depending on power line communication identification signals received via the respective bus bars 3, 4 from the electrical loads attached to these bus bars. Also in this embodiment a coupling capacitor may be integrated in the respective connector 33, in order to electrically connect the power line communicator 316 with the plus and minus conductors of the respective bus bar 3, 4 via the coupling capacitor.

Figure 9:
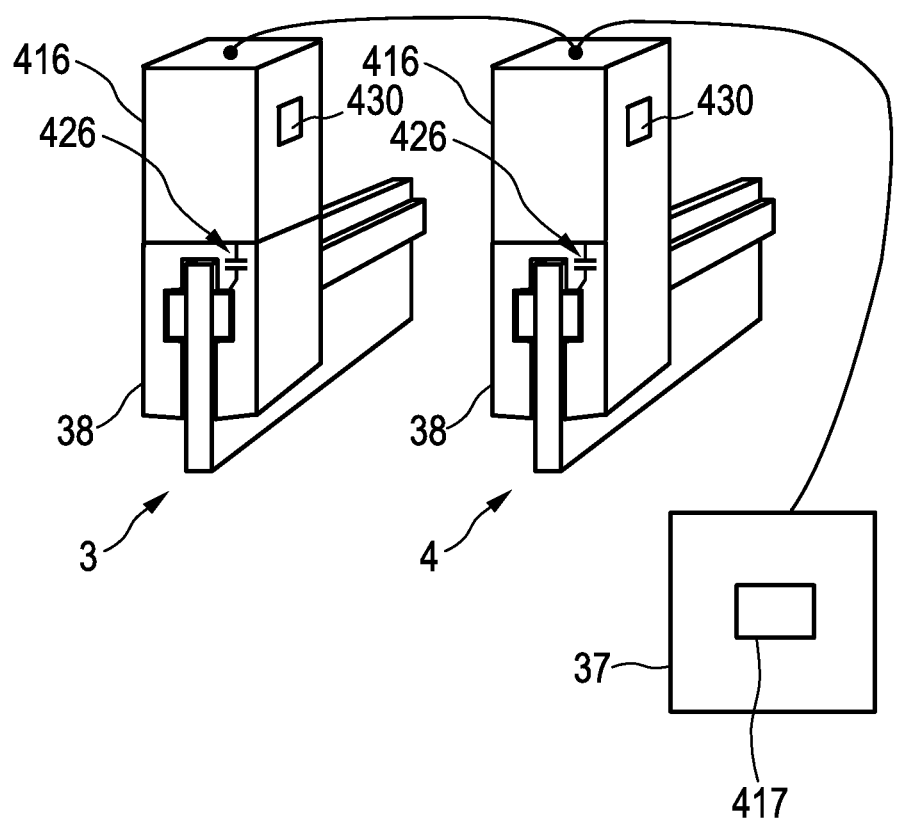
FIG. 9 shows schematically and exemplarily power line communicators integrated in electrical connectors.

In a further embodiment, which is schematically and exemplarily illustrated in FIG. 9, the power line communicators 416 are integrated in electrical connectors 38 to be connected to the bus bars 3, 4. In this embodiment also the coupling capacitors 426 integrated in the connectors 38 are shown. The power line communicators 416 can be controlled by a control system 37, which comprises an electrical loads determination unit 417 for determining the information being indicative of which electrical loads are electrically connected to which ports depending on signals received from the power line communicators 416, which are indicative of the power line identification signals received by the respective power line communicator 416 via the respective bus bar 3, 4 from the electrical loads. Also in this embodiment at least in a discovery mode the different ports of the power supply module are separated from each other regarding the power line communication such that each port together with the bus bars connected to the respective port and the power line communicator 416 connected to these bus bars form a separate power line communication channel.

The electrical connectors 38 can be adapted to be addressable, in order to activate them one-by-one during the discovery process, in particular, by using the control unit 37. They can also be adapted to directly report which electrical loads are visible to the control unit 37. The connectors can be connected to the control unit via a wireless or wired data connection.

The power line communicators 416 comprise user switches 430 for allowing an installer to define which electrical load belongs to which power line communication channel. The user switches 430 are preferentially hardware means, in particular, dip switches. For example, if in another embodiment the system comprises a lot of different bus bars, wherein to each bus bar a power line communicator 416 integrated in an electrical connector 38 is attached, the user switch 430 can comprise, for instance, four sub switches indicating four power line communication universes A, B, C, D. If a certain sub switch is switched to "on", the respective bus bar belongs to the respective power line communication channel. For instance, if the sub switch, which indicates the power line communication universe "B", has been switched on, the respective bus bar and the electrical loads attached to this bus bar belong to the power line communication universe "B". An installer can therefore define which bus bars and thus which electrical loads should be visible in which power line communication universes, wherein still at least two power line communication universes are separated from each other, at least in a discovery procedure, in order to allow the electrical loads determination unit to determine which electrical loads are electrically connected to which group of ports, i.e. the installer can assign bus bars and thus electrical loads to separate power line communication universes as desired.

In a further embodiment the power supply module may be adapted such that power line communication signals propagate between the different ports, wherein a power line communicator is integrated in the power supply module that comprises a filter for filtering a power line communication signal received via the ports, wherein the filter is adapted such that, if power line communication identification signals have been requested via a certain port, the received power line communication identification signals are filtered in a way that the filtered signals are power line communication identification signals only from the electrical loads electrically connected to one or several bus bars, which are electrically connected to the certain port. The filter is preferentially a switchable filter, i.e. a filter that is switchable between the different ports, wherein the filter may be adapted to cut off or short circuit the power line communication for all other ports. Thus, switchable filters may be used that cut off or short circuit a power line communication signal in a channel, which should not receive the power line communication signal, in order to separate, in particular, temporally separate, signals originating from a particular port for allowing for a successful discovery process. The switchable filter may comprise an absorption circuit to short circuit a certain frequency band. The absorption circuit may be a series-resonant circuit comprising a series of a capacitance, an inductance and a switching element. If the power line communication signal is within the frequency band of the absorption circuit, it will be mostly short circuited and can be considered as being switched off, whenever the switch of the series of the capacitance, the inductance and the switching element is conducting.

Instead of the absorption circuit another kind of circuit may be used for filtering out power line communication signals. For instance, band-stop filters may be used. The band-stop filters may comprise a resonant circuit including a capacitance in parallel to an inductance and a switching element, wherein this circuit allows all power line communication signals having a frequency being different to the resonance frequency of the circuit to pass, whereas power line communication signals having the resonance frequency cannot pass. Thus, when the switching element of the circuit is conducting and the power line communication signal has a frequency being similar to the resonance frequency, it cannot pass the circuit and will be filtered out.

Figure 10:
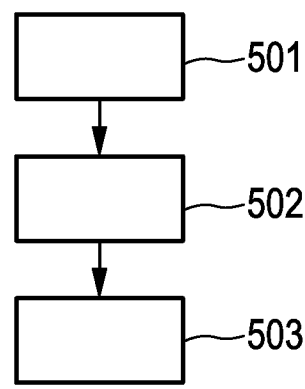
FIG. 10 shows a flowchart exemplarily illustrating an embodiment of an electrical loads determination method for being used with the DC power distribution system.

In the following an electrical loads determination method for being used with the DC power distribution system will exemplarily be described with reference to a flowchart shown in FIG. 10.

In step 501 power line communication identification signals are sent over the bus bars 3, 4 by the electrical loads 7 . . . 13 electrically connected to the bus bars 3, 4, wherein the bus bars 3, 4 are electrically connected to several ports 5, 6 of the power supply module 2 and wherein a power line communication identification signal is indicative of the respective load 7 . . . 13. In step 502 the power line communication identification signals are received via the bus bar components by the power line communicator 16, wherein the power supply module 2, the power line communicator 16 and the several bus bars 3, 4 are adapted such that bus bars 3, 4 electrically connected to different ports 5, 6 belong to separate power line communication channels. In step 503 information being indicative of which electrical loads 7 . . . 13 are electrically connected to which port 5, 6 is determined depending on the received power line communication signals by the electrical loads determination unit 17.

The DC power distribution system is preferentially installed at a ceiling of a room for providing the lighting for the room. Generally, for lighting systems having a large number of lighting devices, which are controlled remotely, commissioning of the lighting devices is a tedious task. It is often difficult to determine which lighting device is connected to which port of a power supply module. The DC power distribution system with the lighting devices and the sensor described above with reference to FIGS. 1 to 9 therefore utilizes separately addressable power line communication universes per power supply module port. In order to provide these separately addressable power line communication universes, the power line communicators, which can also be regarded as being power line communication modems, can be integrated in the power supply module or they can be applied as an external addition to the DC power distribution system. Each port can build a separate power line communication universe, i.e. power line communication signals can be separately addressed to the different ports. This allows, for instance, separating the two branches comprising the bus bar components 3, 4 shown in FIG. 1. Due to this separation the DC power distribution system can perform a discovery procedure, which allows identifying all electrical loads reachable over each port, which can be used for determining information defining which electrical load has been electrically connected to which port. This discovery information may be stored in a table. It may be available for any communication unit, which is in wired or wireless communication with the device, in which the discovery information is stored. For instance, if the discovery information is stored in the power supply module, the discovery information can be available for any communication unit being in communication contact with the power supply module. The communication unit can be a communication unit on the ceiling grid, if the DC power distribution system is installed at a ceiling of a room, the communication unit can be a part of the power supply module, it can be a separate power line communicator, the communication unit can also be a communication unit of an electrical load, the communication unit can be off the ceiling grid, for instance, it can be a handheld communication unit showing the discovery information, it can be a communication unit of a management station managing the DC power distribution system, et cetera. The discovery information may be available in its complete form, i.e. indicating all electrical loads and the respective ports, to which they are electrically connected in one device, for instance, in the power supply module, or the discovery information can be distributed over several devices. For instance, each electrical load may know its own position on a given port and may optionally also know the identities of the other electrical loads on the same port. The discovery information can also comprise identifiers of the power line communicator in charge of the power line communication on a given port, i.e. this information can be stored as well.

The discovery procedure may be triggered by any of the electrical loads on any of the bus bars, by the power supply module or by a dedicated power line communicator. For instance, for triggering the discovery procedure one of these devices can send a triggering signal to the power supply module, which then requests the power line communication identification signals from the electrical loads, in order to allow the electrical loads determination unit to determine the discovery information. A user may trigger the discovery procedure on any of these devices by using, for instance, a hardware switch. A user may also trigger the discovery procedure on any of those devices remotely by using a remote control unit being in wired or wireless data connection with a device of the DC power distribution system, which can trigger the discovery procedure. It is also possible that a device triggers the discovery procedure periodically or depending on a certain event like a restart of the DC power distribution system, after it has at least partly been switched off, because of, for example, an overload condition, or like a detection of a jump in power consumption, which can be due to the insertion of an electrical load. This can allow for an autodiscovery procedure, without needing, for instance, any installer action. For detecting the jump in the power consumption the same circuitry as used for overcurrent protection in accordance with version 1.1 of the EMerge Occupied Space standard may be used. The system can be operable in at least two modes, i.e. a normal mode, in which the power line communication channels are not separated, and a discovery mode, in which the power line communication channels are separated, wherein the system can be switched from the normal mode to the discovery mode, when the discovery procedure has been triggered.

The electrical loads electrically connected to a same port form a group of electrical loads. An installer installing the DC power distribution system can install the electrical loads such that electrical loads, which have a same role, are electrically connected to the same port.

The power supply module with the power line communicator and the electrical loads with the power line communicators described above, especially with reference to FIGS. 1 to 5, can be regarded as being a modified EMerge power supply module and modified EMerge load devices, because an EMerge power supply module and EMerge load devices have been adapted to provide the discovery functionality.

Although in above described embodiments each port belongs to a separate power line communication channel, also another granularity may be used, i.e. several ports may belong to the same power line communication channel. The granularity can correspond to a particular area like zones of a room or even complete rooms or complete room clusters, wherein the electrical loads within these particular areas are powered by several ports forming a group and wherein the ports of this group can belong to the same power line communication channel, i.e. all ports belonging to a particular area can be connected to the same power line communication.

If the DC power distribution system comprises several power line communicators in charge of different separated power line communication channels, the discovery procedure can be performed in parallel for the separate power line communication channels, i.e. for the disjoint segments, in order to shorten the discovery procedure.

Preferentially a group of electrical loads is addressable by the same power line communication channel, if they are electrically connected to the same port of the power supply module. If a command signal is sent by the power supply module via the respective port, in order to request power line communication identification signals from the electrical loads of this group, this group of electrical loads will answer with the power line communication identification signals. Thus, a single command can be used for requesting power line communication identification signals from all electrical loads of this group. This can speed up the process of detecting which electrical loads belong to which group, if it is assumed that all members of a group are electrically connected to the same port.

The power line communicators can have hardware means to connect and disconnect them. For instance, they can comprise dip switches. This can enable a user to temporally or permanently deactivate and activate the communication universes. The power line communicators may be integrated in a power supply module and/or electrical loads and/or may be separate devices. Moreover, power line communicators may be internally or externally added to a power supply module.

If the power line communicator and the electrical loads determination unit are integrated with the power supply module, the power supply module may have integrated the power line communicator and the electrical loads determination unit from the beginning, i.e. the power supply module may be manufactured and sold with the integrated power line communicator and electrical loads determination unit, or the power supply module may later be equipped with an electrical loads determination apparatus comprising the power line communicator and the electrical loads determination unit. Thus, the power supply module may initially be manufactured and sold without power line communicator and electrical loads determination unit, wherein this power supply module can later, especially during installation, be equipped with the electrical loads determination apparatus comprising the power line communicator and the electrical loads determination unit. Embodiments of such an additional electrical loads determination apparatus will in the following be illustrated with reference to FIGS. 11 to 13.

Figure 11:
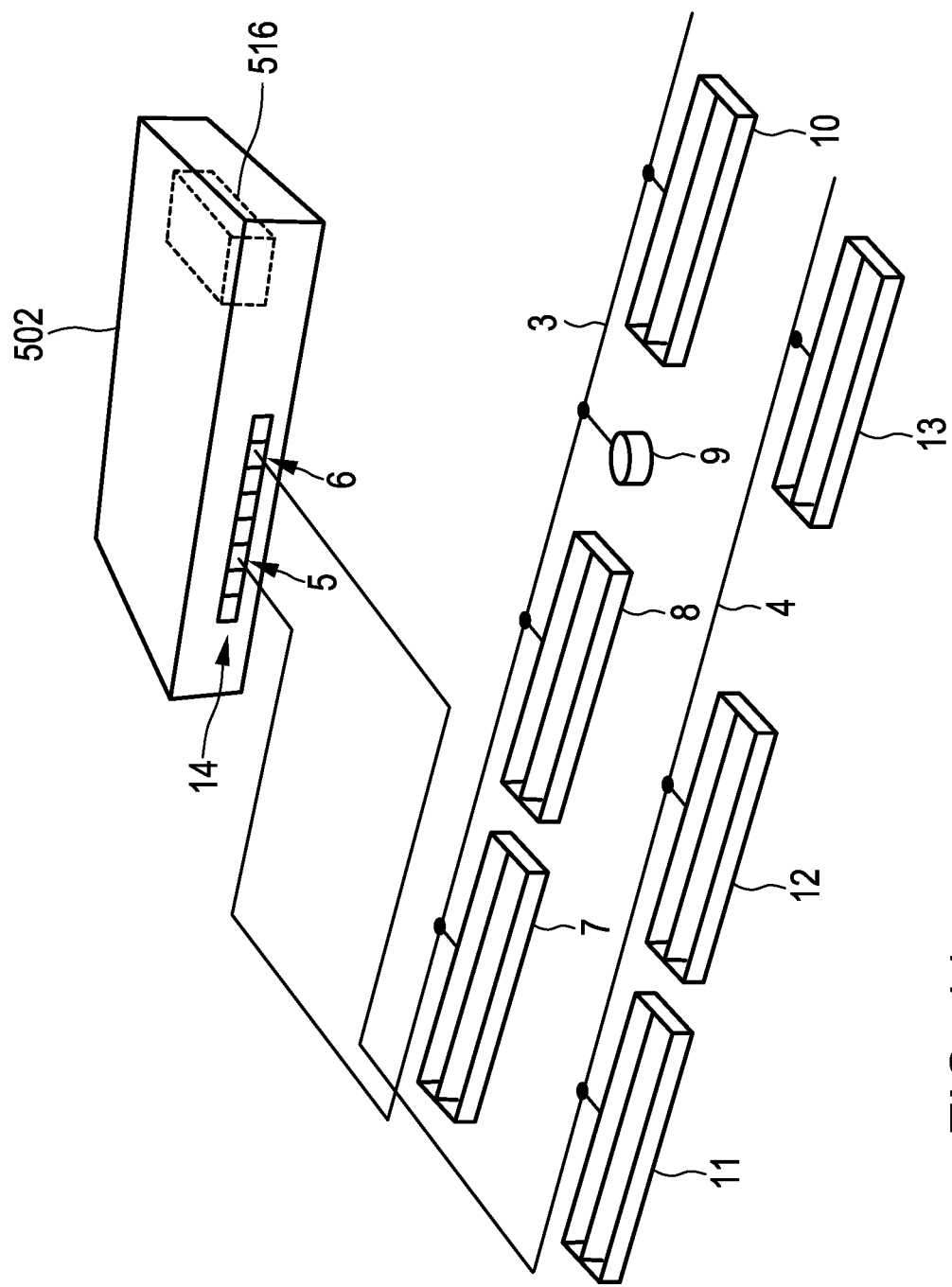
FIGS. 11 to 13 show schematically and exemplarily different kinds of integrating an electrical loads determination apparatus with a power supply module.

In FIG. 11 the power supply module 502 has initially been manufactured and sold without the electrical loads determination apparatus 516. The electrical loads determination apparatus 516 comprises one or several power line communicators for receiving the power line communication identification signals from the electrical loads via the power conductors, wherein the one or several power line communicators are adapted such that power conductors electrically connected to different groups of ports belong to separate power line communication channels, and an electrical loads determination unit for determining information being indicative of which electrical loads are electrically connected to which group of ports depending on the received power line communication identification signals. The electrical loads determination apparatus 516 can be internally installed as an add-on by an installer. This is assumed to be done by trained service personnel as the power supply module 502 needs to be opened for installing the electrical loads determination apparatus 516. After the electrical loads determination apparatus 516 has been installed within the power supply module 502, the resulting updated power supply module is configured, for instance, as described above with reference to FIG. 2 or as described above with reference to FIG. 5, wherein the electrical loads determination apparatus may comprise the electrical loads determination unit 17, the power line communicator 16 and the switching unit 18 shown in FIG. 2 or the power line communicators 16 and the electrical loads determination unit 17 shown in FIG. 5, respectively, whereas the other components may be included in the original power supply module 502. The initial power supply module 502 and the electrical loads determination apparatus 516 preferentially comprise electrical connectors, which have to be electrically connected by the installer, in order to provide the electrical loads determination functionality.

Figure 12:
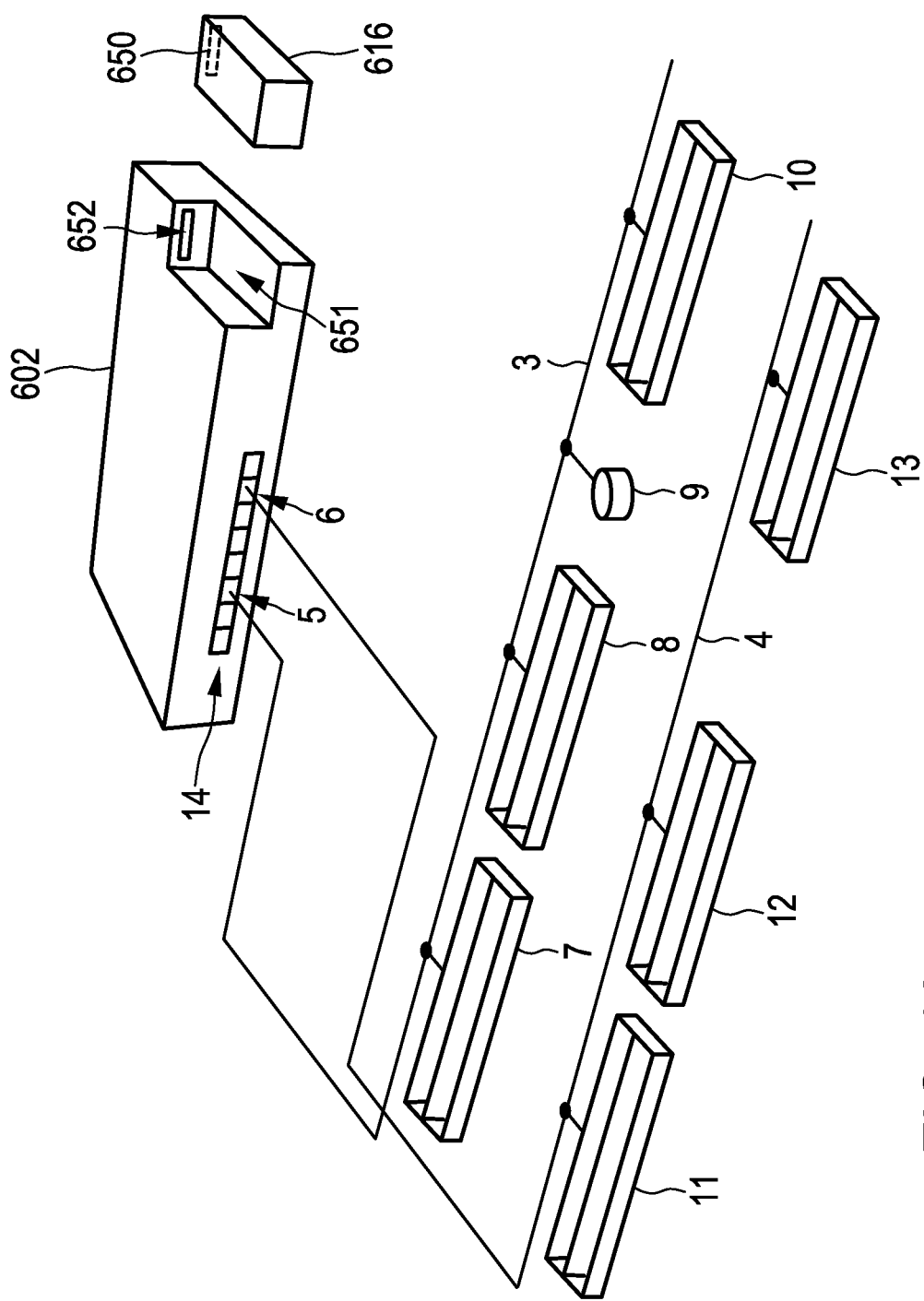

FIG. 12 schematically and exemplarily illustrates the power supply module 602, which has been manufactured and sold without comprising a power line communicator and an electrical loads determination unit, but with a receiving section with an electrical connector 652 for receiving an electrical loads determination apparatus 616. The electrical loads determination apparatus 616 comprises electrical connectors 650, which fit into the electrical connector 652 of the power supply module 602, when the electrical loads determination apparatus 616 is inserted into the receiving section 651. Also in this embodiment the electrical loads determination apparatus 616 comprises one or several power line communicators for receiving the power line communication identification signals from the electrical loads via the power conductors, wherein also the one or several power line communicators are adapted such that the power conductors electrically connected to different groups of ports belong to separate power line communication channels, and an electrical loads determination unit for determining information being indicative of which electrical loads are electrically connected to which group of ports depending on the received power line communication identification signals. The electrical connectors 650, 652 are configured such that the different components of the power supply module 602 and the electrical loads determination apparatus 616 are electrically connected as described above with reference to, for instance, FIG. 2 or FIG. 5, when the electrical loads determination apparatus 616 has been inserted into the receiving section 651 of the power supply module 602. The electrical loads determination apparatus 616 is a module that can be installed by untrained personnel by sliding it into the receiving section 651 with the electrical connector 652, which may be regarded as being a connection slot. In this embodiment the electrical loads determination apparatus may be added to the power supply module without needing to open the power supply module.

Figure 13:
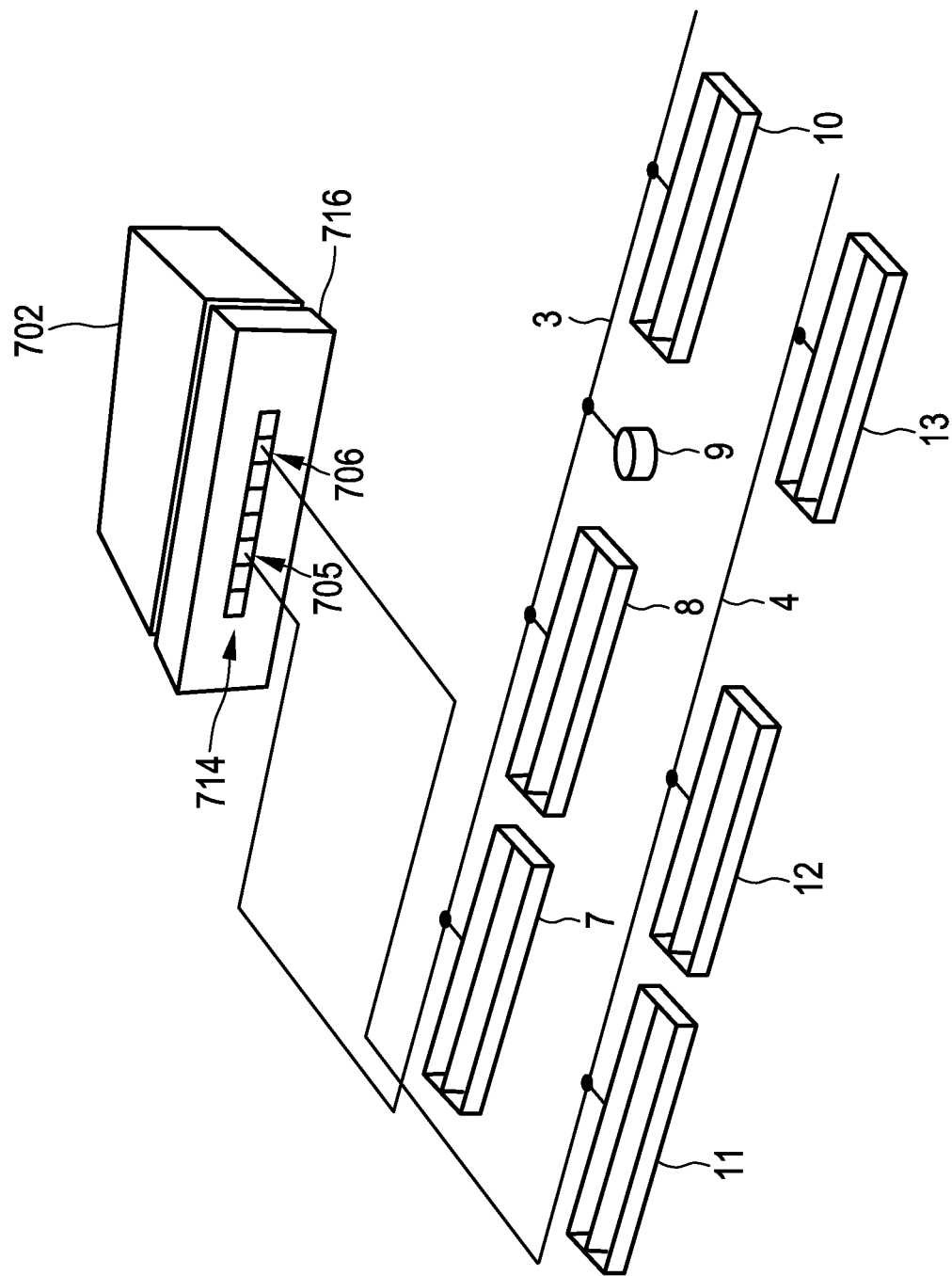

FIG. 13 schematically and exemplarily illustrates a further embodiment of a power supply module 702, which is initially not equipped with a power line communicator and an electrical loads determination unit. An electrical loads determination apparatus 716 has been attached to the power supply module 702 such that the ports of the power supply module 702 are electrically connected to the electrical loads determination apparatus 716. Also in this embodiment the electrical loads determination apparatus 716 comprises one or several power line communicators for receiving the power line communication identification signals from the electrical loads via the power conductors, wherein the one or several power line communicators are adapted such that power conductors electrically connected to different groups of ports belong to separate power line communication channels, and an electrical loads determination unit for determining information being indicative of which electrical loads are electrically connected to which group of ports depending on the received power line communication identification signals. The electrical loads determination apparatus comprises ports 714, which correspond to the ports of the power supply module 702, wherein the power conductors are electrically connected to the respective ports of the power supply module 702 via the ports 705, 706 of the electrical loads determination apparatus 716. The backside of the electrical loads determination apparatus 716 may comprise electrical connectors for being inserted into the ports of the power supply module 702, wherein these electrical connectors may be configured such that the updated power supply module, i.e. the power supply module 702 with the added electrical loads determination apparatus 716, comprises the configuration described above with reference to, for instance, FIG. 2 or FIG. 5. The electrical loads determination apparatus 716 can be regarded as being a piggy-bag plug-in module populating the output ports and offering connectors, i.e. the ports 714, to which the power conductors can be connected.

Thus, the electrical loads determination apparatus can be regarded as being a kind of "mid span" device having electrical connectors on an input side for being connected to the power supply module and further electrical connectors on an output side where the connectors of the power conductors can be plugged in. The connection between the electrical loads determination apparatus 716 and the power supply module 702 can be via cables, wherein, for instance, the electrical loads determination apparatus can comprise at its backside several cables to be plugged into the ports of the power supply module 702.

In a further embodiment the electrical loads determination apparatus can comprise at least two separate modules, wherein in one of these modules the one or several power line communicators are integrated and in another of these modules the electrical loads determination unit is integrated, wherein these at least two components of the electrical loads determination apparatus can be connected to the power line communication channels at different locations. For instance, a first component comprising the one or several power line communicators can be attached to the power supply module as schematically and exemplarily illustrated above with reference to FIGS. 11 to 13, wherein a second component comprising the electrical loads determination unit can be attached somewhere else. In this case the first and second components are able to exchange information by using a wired or wireless data connection, in order to allow the second component with the electrical loads determination unit to determine which electrical loads are electrically connected to which group of ports depending on the power line communication signals received by the first component.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Operations like the sending and/or receiving of power line communication signals, switching operations, filtering operations, determinations of which electrical loads are electrically connected to which groups of ports, et cetera performed by one or several units or devices can be performed by any other number of units or devices. For instance, steps 502 and 503 can be performed by a single unit or by any other number of different units. These operations and/or the control of the DC power distribution system in accordance with the electrical loads determination method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a DC power distribution system, especially an EMerge DC power distribution system. The system is adapted such that power conductors electrically connected to different groups of ports belong to separate power line communication channels, wherein several electrical loads are in power line communication with a group of ports of a same power line communication channel. The separation of the different power line communication channels allows for a relatively simple determination to which group of ports which electrical loads are electrically connected. This information can be used by, for instance, a user to commission the electrical loads. For example, if the locations of the power conductors, which are electrically connected to certain groups of ports, are known, the information about which electrical loads are connected to which groups of ports can be used for determining the location of the respective electrical load.

The invention claimed is:

1. A diagnostic unit for a DC power distribution system, wherein the diagnostic unit is adapted to initiate sending power line communication signals via a first power line communication channel and receiving power line communication signals via a separate, second power line communication channel, wherein the diagnostic unit is further adapted to diagnose a disturbance of one power line communication channel by another separate power line communication channel, when a power line communication signal is received via the separate, second power line communication channel, which is influenced by a power line communication signal sent via the first power line communication channel, wherein the DC power distribution system, comprises:
a power supply module having several ports for providing DC power,
several power conductors electrically connected to the several ports for distributing the DC power and for transmitting power line communication signals, and
several electrical loads electrically connected to the power conductors, wherein the electrical loads are adapted to send power line communication identification signals over the power conductors, wherein a power line communication identification signal is indicative of the respective electrical load,
wherein the power supply module and the power conductors are adapted such that power conductors electrically connected to different groups of ports belong to separate power line communication channels and wherein several electrical loads are in power line communication with a group of ports of a same power line communication channel.

2. The diagnostic unit as defined in claim 1, wherein the system further comprises a power line communicator for receiving the power line communication identification signals from the electrical loads via the power conductors and an electrical loads determination unit for determining information being indicative of which electrical loads are electrically connected to which group of ports depending on the received power line communication identification signals, wherein also the power line communicator is adapted such that power conductors electrically connected to different groups of ports belong to separate power line communication channels.

3. The diagnostic unit as defined in claim 2, wherein the power line communicator is connected to the ports via a switching unit, wherein the switching unit is adapted such that the power line communicator is switchable between the several groups of ports.

4. The diagnostic unit as defined in claim 2, wherein the system comprises several power line communicators connected to the groups of ports such that to each group of ports a separate power line communicator is connected.

5. The diagnostic unit as defined in claim 2, wherein the power line communicator is integrated with the power supply module.

6. The diagnostic unit as defined in claim 2, wherein the power line communicator is a separate device electrically connectable to a power conductor, in order to receive power line communication identification signals from the power conductor.

7. The diagnostic unit as defined in claim 6, wherein the power line communicator is a separate device electrically connected to several power conductors, which are connected to different groups of ports, wherein the system comprises a switching unit for switching via which power conductor power line communication signals are to be sent and/or received by the power line communicator.

8. The diagnostic unit as defined in claim 7, wherein the power line communicator is connected to the several power conductors via electrical connectors, wherein the electrical connectors comprise switching elements forming the switching unit.

9. The diagnostic unit as defined in claim 2, wherein the power line communicator is integrated in an electrical connector to be connected to a power conductor.

10. The diagnostic unit as defined in claim 2, wherein the system comprises at least two power line communicators connected to at least two different groups of ports, wherein the at least two power line communicators are adapted to concurrently receive power line communication identification signals.

11. The diagnostic unit as defined in claim 2, wherein the power line communicator comprises a user switch for allowing a user to define which electrical load belongs to which power line communication channel.

12. A diagnostic method for a DC power distribution system, the method comprising:
sending power line communication signals via a first power line communication channel,
receiving power line communication signals via a separate, second power line communication channel, diagnosing a disturbance of one power line communication channel by another separate power line communication channel, when a power line communication signal is received via the separate, second power line communication channel, which is influenced by a power line communication signal sent via the first power line communication channel.

13. A diagnostic method computer program product for being used with a DC power distribution system, the computer program comprising program code means for causing a DC power distribution system to carry out the steps of the diagnostic method for a DC power distribution system as defined in claim 12, when the computer program is run on a computer controlling the DC power distribution system, wherein the DC power distribution system, the system, comprises:

a power supply module having several ports for providing DC power, several power conductors electrically connected to the several ports for distributing the DC power and for transmitting power line communication signals, and several electrical loads electrically connected to the power conductors, wherein the electrical loads are adapted to send power line communication identification signals over the power conductors, wherein a power line communication identification signal is indicative of the respective electrical load, wherein the power supply module and the power conductors are adapted such that power conductors electrically connected to different groups of ports belong to separate power line communication channels and wherein several electrical loads are in power line communication with a group of ports of a same power line communication channel.

* * * * *